(12) United States Patent
Sakuma et al.

(10) Patent No.: US 10,739,476 B2
(45) Date of Patent: Aug. 11, 2020

(54) SEISMIC SENSOR AND EARTHQUAKE DETERMINATION METHOD

(71) Applicants: TOKYO GAS CO., LTD., Tokyo (JP); OMRON Corporation, Kyoto (JP)

(72) Inventors: Hirohisa Sakuma, Tokyo (JP); Naotsugu Ueda, Shiga (JP); Hiroyuki Mino, Osaka (JP)

(73) Assignees: TOKYO GAS CO., LTD., Tokyo (JP); Omron Corporation, Kyoto (JP)

( * ) Notice: Subject to any disclaimer, the term of this patent is extended or adjusted under 35 U.S.C. 154(b) by 187 days.

(21) Appl. No.: 15/740,939

(22) PCT Filed: Jun. 30, 2016

(86) PCT No.: PCT/JP2016/069548
§ 371 (c)(1),
(2) Date: Dec. 29, 2017

(87) PCT Pub. No.: WO2017/002946
PCT Pub. Date: Jan. 5, 2017

(65) Prior Publication Data
US 2018/0188396 A1 Jul. 5, 2018

(30) Foreign Application Priority Data
Jul. 2, 2015 (JP) ................. 2015-133851

(51) Int. Cl.
*G01V 1/16* (2006.01)
*G01V 1/00* (2006.01)
*G01V 1/18* (2006.01)

(52) U.S. Cl.
CPC .............. *G01V 1/164* (2013.01); *G01V 1/008* (2013.01); *G01V 1/18* (2013.01); *G01V 2210/1232* (2013.01)

(58) Field of Classification Search
CPC ................. G01V 1/164; G01V 1/18
(Continued)

(56) References Cited

U.S. PATENT DOCUMENTS

| 5,101,195 A | 3/1992 | Caillat et al. |
| 2007/0144242 A1 | 6/2007 | Matsumiya et al. |

(Continued)

FOREIGN PATENT DOCUMENTS

| CN | 2125150 U | 12/1992 |
| CN | 101726752 A | 6/2010 |

(Continued)

OTHER PUBLICATIONS

Office Action issued in Chinese Application No. 201680039053.1, dated Nov. 2, 2018 (18 pages).

(Continued)

*Primary Examiner* — Lisa M Caputo
*Assistant Examiner* — Rose M Miller
(74) *Attorney, Agent, or Firm* — Osha Liang LLP

(57) ABSTRACT

A seismic sensor that suppresses power consumption operates in a power-saving mode and a measurement mode in which the power consumption is larger than that in the power-saving mode. The seismic sensor includes a measurement unit that measures an acceleration, a filtering unit that, if the acceleration measured by the measurement unit exceeds a predetermined threshold, causes a shift from the power-saving mode to the measurement mode to be performed, and performs filtering on the measured acceleration, an earthquake determination unit that determines whether or not an earthquake has occurred based on the filtered acceleration, and an index calculation unit that, if where the earthquake determination unit determined that an earthquake has occurred, calculates an index value indicating the scale of the earthquake. A shift from the measurement mode (Continued)

to the power-saving mode is performed if the earthquake determination unit determined that no earthquake has occurred.

3 Claims, 4 Drawing Sheets

(58) Field of Classification Search
USPC .................................. 73/661, 652, 658, 649
See application file for complete search history.

(56) References Cited

U.S. PATENT DOCUMENTS

| | | |
|---|---|---|
| 2008/0231343 A1 | 9/2008 | Leigh et al. |
| 2010/0103777 A1 | 4/2010 | Chen |
| 2014/0266762 A1* | 9/2014 | Warren ................. G08B 27/00 340/690 |
| 2017/0003406 A1* | 1/2017 | Ueda ...................... G01V 1/162 |

FOREIGN PATENT DOCUMENTS

| | | | |
|---|---|---|---|
| EP | 2944979 A1 | 11/2015 | |
| JP | S60-095376 A | 5/1985 | |
| JP | H08-285621 A | 11/1996 | |
| JP | 4096401 B2 | 6/2008 | |
| JP | 2009002914 A | 1/2009 | |
| JP | 4427911 B2 | 3/2010 | |
| JP | 2013-088314 A | 5/2013 | |
| JP | 2013-108847 A | 6/2013 | |
| JP | 2014-134501 A | 7/2014 | |

OTHER PUBLICATIONS

Extended European Search Report issued in European Application No. 16818054.5, dated Feb. 1, 2019 (9 pages).
International Search Report issued in corresponding application No. PCT/JP2016/069548 dated Sep. 13, 2016 (2 pages).
Office Action issued in the counterpart Japanese Application No. 2015-133851, dated Nov. 5, 2019 (4 pages).
Office Action in counterpart Chinese Application No. 201680039053.1 dated Apr. 26, 2020 (25 pages).
Y. Haiying et al; "Preliminary analysis of records for strong motion of 7.0 magnitude earthquake in Lushan and aftershock"; Earthquake Engineering and Engineering Vibration, vol. 34, Supplementary Issue, pp. 153-160; Aug. 2014 (8 pages).

* cited by examiner

SEISMIC SENSOR AND EARTHQUAKE DETERMINATION METHOD

TECHNICAL FIELD

The present invention relates to a seismic sensor and an earthquake determination method.

RELATED ART

Conventionally, a control method for an electric device has been proposed in which a reference value that is base vibration data in a steady state is constantly calculated with a moving average method by calculating an average value of vibration acceleration data within a predetermined time measured by an acceleration sensor and also repeatedly calculating the average value, and an earthquake occurrence determination unit compares the reference value calculated in the reference value calculating unit with real-time acceleration data measured by the acceleration sensor and determines that an earthquake has occurred in the case where the difference between the real-time acceleration data and the reference value exceeds a predetermined threshold (e.g. Patent Document 1). Also, a seismometer has been proposed that monitors whether a noise level exceeds a certain threshold, determines that a delay will occur in earthquake detection when the noise level exceeds the threshold, and transmits an abnormality notification signal to a central control device constituting a seismometer abnormality monitoring system (e.g. Patent Document 2). Additionally, a technology has been proposed in which an output value obtained from an output means after power is supplied is set as a zero level at which vibration is zero (e.g. Patent Document 3). In this technology, after power is supplied, it is determined whether or not the output value fluctuates continuously under a predetermined level for a predetermined time or longer, and setting is performed in the case where it is determined that the output value is stable. In addition, a technology has been proposed in which it is determined whether or not each of signals filtered by a filter means exceeds a predetermined level (e.g. Patent Document 4). In this technology, a high-pass filter and a low-pass filter are provided, and a frequency band for detecting a predetermined earthquake intensity is extracted without using Fourier transform.

RELATED ART DOCUMENTS

Patent Documents

Patent Document 1: JP 2013-088314A
Patent Document 2: JP 2013-108847A
Patent Document 3: JP 4096401B
Patent Document 4: JP 44279111

SUMMARY OF THE INVENTION

A seismic sensor using a microcontroller can obtain an index value for evaluating the scale of an earthquake by arithmetic processing, but on the other hand, power consumption tends to be larger compared to that of a conventionally-used mechanical seismic sensor that is energized by vibration. In addition, in the case of a device that is provided in a meter box or the like and is battery-driven, such as a seismic sensor used for blocking the supply of gas and electricity when an earthquake occurs, it is particularly desirable to reduce the standby power consumption. However, depending on the environment where the device is disposed, noise due to the passage of vehicles, construction, and the like is also measured, and thus the measured noise level varies. Repeating such erroneous detection increases the power consumption of the seismic sensor. However, most conventional seismic sensors are premised on semi-permanent power feeding, and thus technology for reducing power consumption has not been proposed much.

One or more embodiments of the present invention may suppress the power consumption of a seismic sensor.

A seismic sensor according to one or more embodiments of the present invention operates in a power-saving mode and a measurement mode in which the power consumption is larger than that in the power-saving mode. Also, the seismic sensor includes a measurement unit that measures an acceleration, an activation determination unit that, in a case where the acceleration measured by the measurement unit exceeds a predetermined threshold, causes a shift from the power-saving mode to the measurement mode to be performed, and performs filtering on the measured acceleration, an earthquake determination unit that determines whether or not an earthquake has occurred based on the filtered acceleration, and an index calculation unit that, in a case where the earthquake determination unit determined that an earthquake has occurred, calculates an index value indicating a scale of the earthquake, wherein a shift from the measurement mode to the power-saving mode is performed in a case where the earthquake determination unit determined that no earthquake has occurred.

According to this configuration, in the case where it is determined that no earthquake has occurred, a shift to the power-saving mode is performed without calculation of the index value by the index calculation unit, and thus unnecessary power consumption is suppressed. In particular, a noise component is eliminated by the filtering performed on the acceleration, and the determination accuracy of the earthquake determination unit can be enhanced, whereby the shift to the power-saving mode can be performed appropriately and promptly, and power consumption can be reduced.

In addition, the filtering unit may calculate a moving average of the acceleration. According to this configuration, the filtering unit has a characteristic like that of a low-pass filter, and can eliminate an acceleration noise component.

Also, the earthquake determination unit may determine that an earthquake has occurred in a case where a difference between a maximum and a minimum value of, an average of, or a sum of an average value and a variance value of acceleration that was measured in a predetermined time and filtered is larger than a predetermined threshold. Specifically, any of the abovementioned values is calculated using the filtered acceleration, and therefore the determination of whether or not an earthquake has occurred can be performed.

In addition, an earthquake determination method according to another aspect of the present invention is executed by a seismic sensor that operates in a power-saving mode and a measurement mode in which power consumption is larger than that in the power-saving mode. Specifically, the earthquake determination method includes a measurement step of measuring an acceleration, a filtering step of, in a case where the acceleration measured in the measuring step exceeds a predetermined threshold, causing a shift from the power-saving mode to the measurement mode to be performed, and performing filtering on the measured acceleration, and an earthquake determination step of determining whether or not an earthquake has occurred based on the filtered acceleration, and in a case where it is determined that no earthquake has occurred in the earthquake determination step, a shift from the measurement mode to the power-saving mode is performed, and the filtering is stopped.

According to this earthquake determination method, in the case where it is determined that no earthquake has occurred, the mode is shifted to the power-saving mode without calculation of the index value by the index calculation unit, and thus unnecessary power consumption is suppressed. In particular, a noise component is eliminated by the filtering performed on the acceleration, and the determination accuracy in the earthquake determination step can be enhanced, whereby the shift to the power-saving mode can be performed appropriately and promptly, and power consumption can be reduced.

Effects of the Invention

The power consumption of a seismic sensor can be suppressed.

EMBODIMENTS OF THE INVENTION

In the following, a seismic sensor according to embodiments of the present invention is described with reference to the drawings. It should be noted that an embodiment described in the following shows an example of a seismic sensor, and that a seismic sensor according to the present invention is not limited to the following configuration.

Device Configuration

Figure 1:
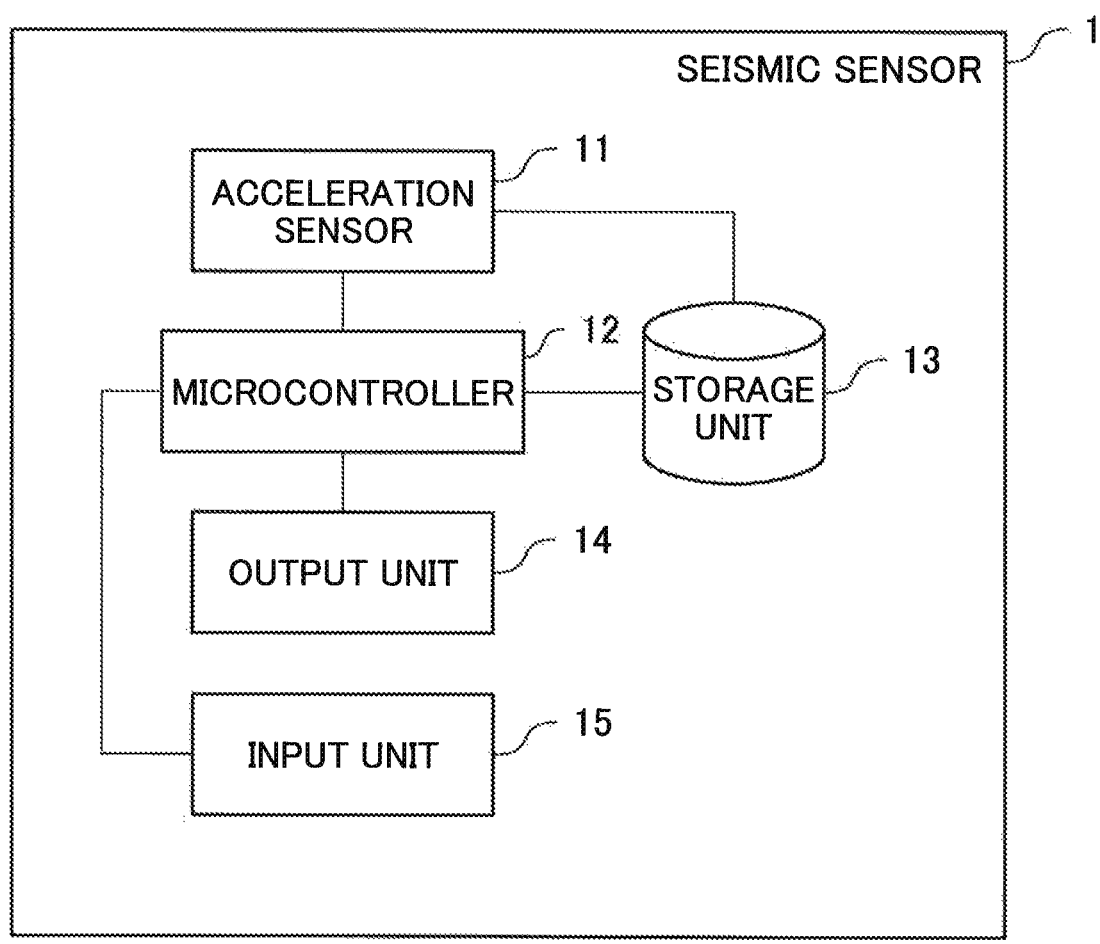
FIG. 1 is a device configuration diagram showing an example of a seismic sensor.

FIG. 1 is a device configuration diagram showing an example of a seismic sensor. A seismic sensor 1 has an acceleration sensor 11, a microcontroller 12, a storage unit 13, an output unit 14, and an input unit 15. The acceleration sensor 11 is, for example, an acceleration sensor using a piezoelectric element, or an acceleration sensor that detects capacitance between electrodes. Note that the acceleration measured (also referred to as "sampled") by the acceleration sensor 11 is output to the microcontroller 12. The microcontroller 12 is, for example, a general-purpose integrated circuit, obtains the acceleration measured by the acceleration sensor 11 at a predetermined period, and, based on the acceleration, detects an occurrence of an earthquake and calculates an index value indicating the scale of an earthquake. Also, according to the circumstances, the microcontroller 12 operates in different modes, namely an active mode and a sleep mode. The sleep mode is a mode in which the microcontroller 12 operates with limited functions, such as stopping the execution of a command and supplying a clock while receiving an interrupt, and thereby power consumption is reduced compared to that in the active mode. In the active mode, the microcontroller 12 performs earthquake or noise determination processing, and calculates an index value indicating the scale of an earthquake. The storage unit 13 is a temporary storage means such as a RAM (Random Access Memory), or a non-volatile memory such as EPROM (Erasable Programmable Read Only Memory), and for example, holds the measured acceleration and a threshold used for an earthquake determination. Note that the storage unit 13 may also be a memory built into in the acceleration sensor 11 or the microcontroller 12. Also, the output unit 14 is, for example, an output terminal included in the microcontroller 12. In the case where it was determined that an earthquake occurred, the microcontroller 12 outputs information notifying the occurrence of an earthquake and its scale to another device via the output unit 14. Also, an input unit 15 is an input terminal included in the microcontroller 12. The microcontroller 12 may also receive, for example, an operation of a switch which is not shown and an input of a command from another device and the like, via the input unit 15. Note that a high-pass filter, which is not shown, may also be provided between the acceleration sensor 11 and the microcontroller 12 to eliminate a gravity component. In addition, the microcontroller 12 may also convert the acceleration measured by the acceleration sensor 11 to the absolute value of the acceleration based on a predetermined offset for processing.

Functional Configuration

Figure 2:
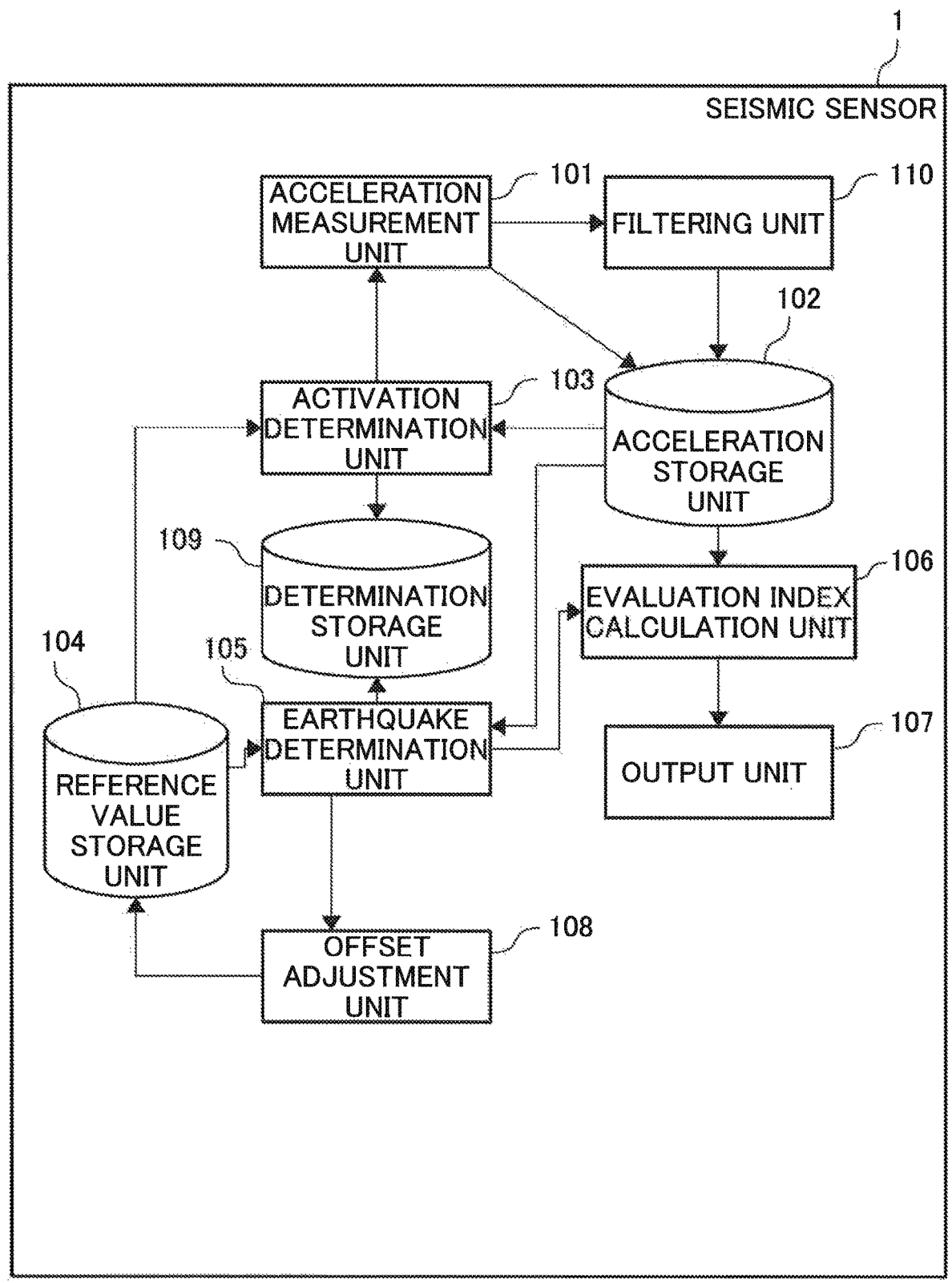
FIG. 2 is a functional block diagram showing an example of a seismic sensor.

FIG. 2 is a functional block diagram showing an example of the seismic sensor 1. The seismic sensor 1 includes an acceleration measurement unit 101, an acceleration storage unit 102, an activation determination unit 103, a reference value storage unit 104, an earthquake determination unit 105, an evaluation index calculation unit 106, an output unit 107, an offset adjustment unit 108, a determination storage unit 109, and a filtering unit 110. Note that the acceleration measurement unit 101, the activation determination unit 103, the earthquake determination unit 105, the evaluation index calculation unit 106, the offset adjustment unit 108, and the filtering unit 110 are realized by the acceleration sensor 11 or the microcontroller 12, shown in FIG. 1, operating based on a predetermined program. Also, the acceleration storage unit 102, the reference value storage unit 104, and the determination storage unit 109 are configured by the storage unit 13 shown in FIG. 1. Note that at least the earthquake determination unit 105 and the evaluation index calculation unit 106 are realized by the microcontroller 12 operating in the active mode. Also, the output unit 107 is realized by the microcontroller 12 and the output unit 14 in FIG. 1 operating based on a predetermined program.

The acceleration measurement unit 101 measures an acceleration at a predetermined period. Note that the acceleration measurement unit 101 normally repeats the measurement of the acceleration at a comparatively low speed (that is, at a comparatively large measurement period, which is also referred to as "a first period"). In addition, in the case where such low-speed sampling is performed, the microcontroller 12 basically operates in the sleep mode. Such an operation state with small power consumption is also referred to as a "power-saving mode" or "standby mode". In other words, "power-saving mode" is an operation state in which low-speed sampling is performed, and in this case, the microcontroller 12 operates in the sleep mode with limited functions, and thus power consumption is suppressed. In addition, in the case when vibration larger than a threshold set in advance in the reference value storage unit 104 is detected, the acceleration measurement unit 101 repeats the measurement of the acceleration at a higher speed than that in the low-speed sampling (that is, at a comparatively small period, which is also referred to as a "second period"). When such high-speed sampling is performed, the microcontroller 12 operates in the sleep mode or the active mode. Note that in the case where the earthquake determination unit 105 and the evaluation index calculation unit 106 perform processing, the microcontroller 12 operates in the active mode. This operation state in which the high-speed sampling is performed is also referred to as a "measurement mode", and shifting of the operation state from the power-saving mode to the measurement mode is also referred to as "activation". In other words, the "measurement mode" is the operation state in which the high-speed sampling is performed, and in this case, the microcontroller 12 may operate in the sleep mode with limited functions, or may operate in the active mode in which operation can be performed with the maximum calculation capability. In the measurement mode, the microcontroller 12 switches from the sleep mode to the active mode, and therefore power consumption becomes larger than that in the power-saving mode.

The filtering unit 110 performs filtering processing on the acceleration values measured by the acceleration measurement unit 101, and causes the acceleration storage unit 102 to hold the filtered acceleration. In this embodiment, the filtering unit 110 operates as a so-called digital filter. It is possible to adopt existing technology to the specific method of the filtering. The filtering unit 110 functions as a low-pass filter by, for example, calculating a moving average of the absolute values of the acceleration.

In addition, the acceleration storage unit 102 holds the acceleration values measured by the acceleration measurement unit 101, or the acceleration values filtered by the filtering unit 110. The activation determination unit 103 compares an acceleration value measured by the acceleration measurement unit 101 with an activation threshold held in the reference value storage unit 104, and in the case where the acceleration value exceeds the activation threshold, causes activation from the power-saving mode to the measurement mode. In addition, the earthquake determination unit 105 determines whether a measured acceleration indicates an earthquake or noise, by using the acceleration measured by the acceleration measurement unit 101 in the measurement mode and the threshold set in advance in the reference value storage unit 104.

In the case where the earthquake determination unit 105 determined that an earthquake has occurred, the evaluation index calculation unit 106 calculates an evaluation index indicating the scale of the earthquake. For example, an SI (spectrum intensity) value is calculated as the earthquake evaluation index. Then, the output unit 107 outputs the calculated SI value to an external device.

Figure 3:
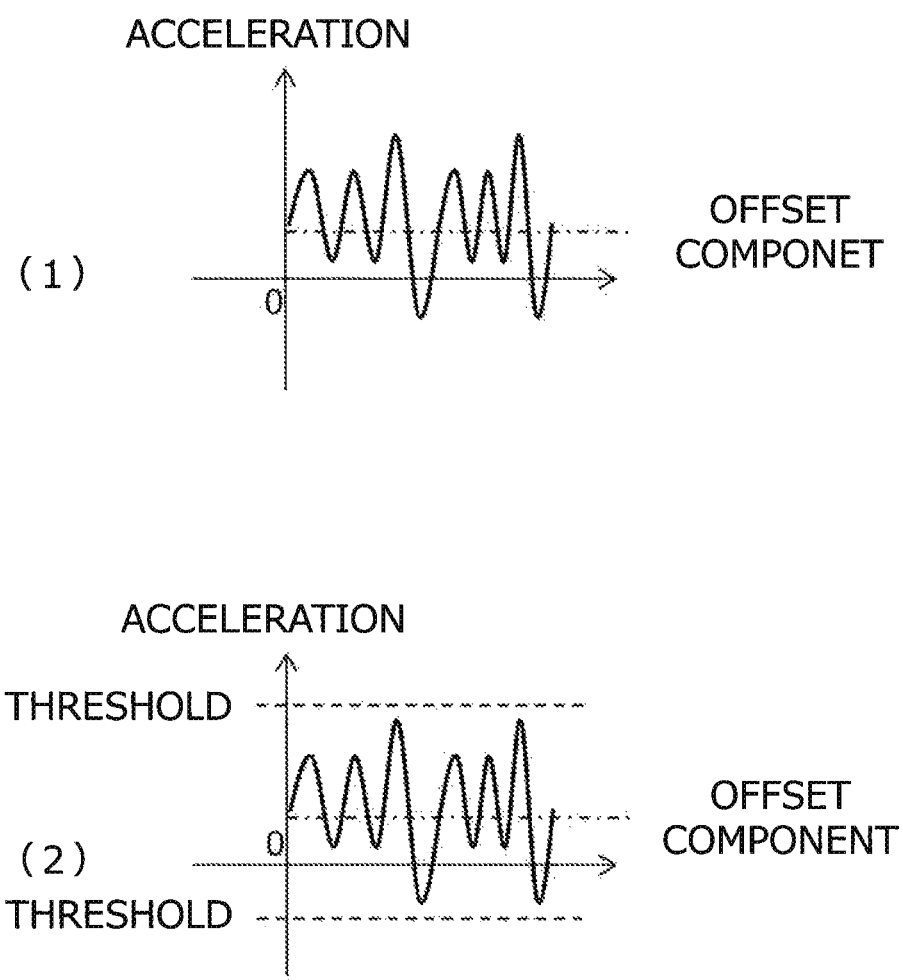
FIG. 3 is a diagram for illustrating a measured acceleration and a threshold in this embodiment.

On the other hand, in the case where the earthquake determination unit 105 determined that the vibration is noise, the offset adjustment unit 108 performs a so-called offset adjustment. In this embodiment, "offset component" refers to the noise component included in the measured acceleration, such as variation in the measurement value that occurs according to change with the elapse of time of the sensor, variation in the measurement value that occurs according to change in temperature, and variation in the measurement value that occurs according to change of the direction of gravity acceleration relative to the sensor in the case where the posture of the installed sensor is inclined for some reason. The offset adjustment unit 108 calculates, for example, a central value between the maximum value and the minimum value of the acceleration that was determined to be noise, and the average value of the acceleration, as the offset component. FIG. 3 is a diagram for illustrating a measured acceleration and a threshold in this embodiment. In the graph in FIG. 3, the vertical axis indicates the magnitude of the acceleration, and the horizontal axis indicates the lapse of time. As shown in FIG. 3(1), in the case where the vibration shown by the bold continuous line is measured, the offset component can be calculated as the average value of the acceleration, for example, as shown by the dashed-dotted dash line. The calculated offset component is stored in the reference value storage unit 104, and used for the activation determination performed by the activation determination unit 103, and the earthquake determination performed by the earthquake determination unit 105. In addition, as shown in FIG. 3(2), in the case where the vibration shown by the bold solid line is measured, the threshold is defined as the value relative to the offset component, as shown with the dash lines.

Seismometry Processing

Figure 4:
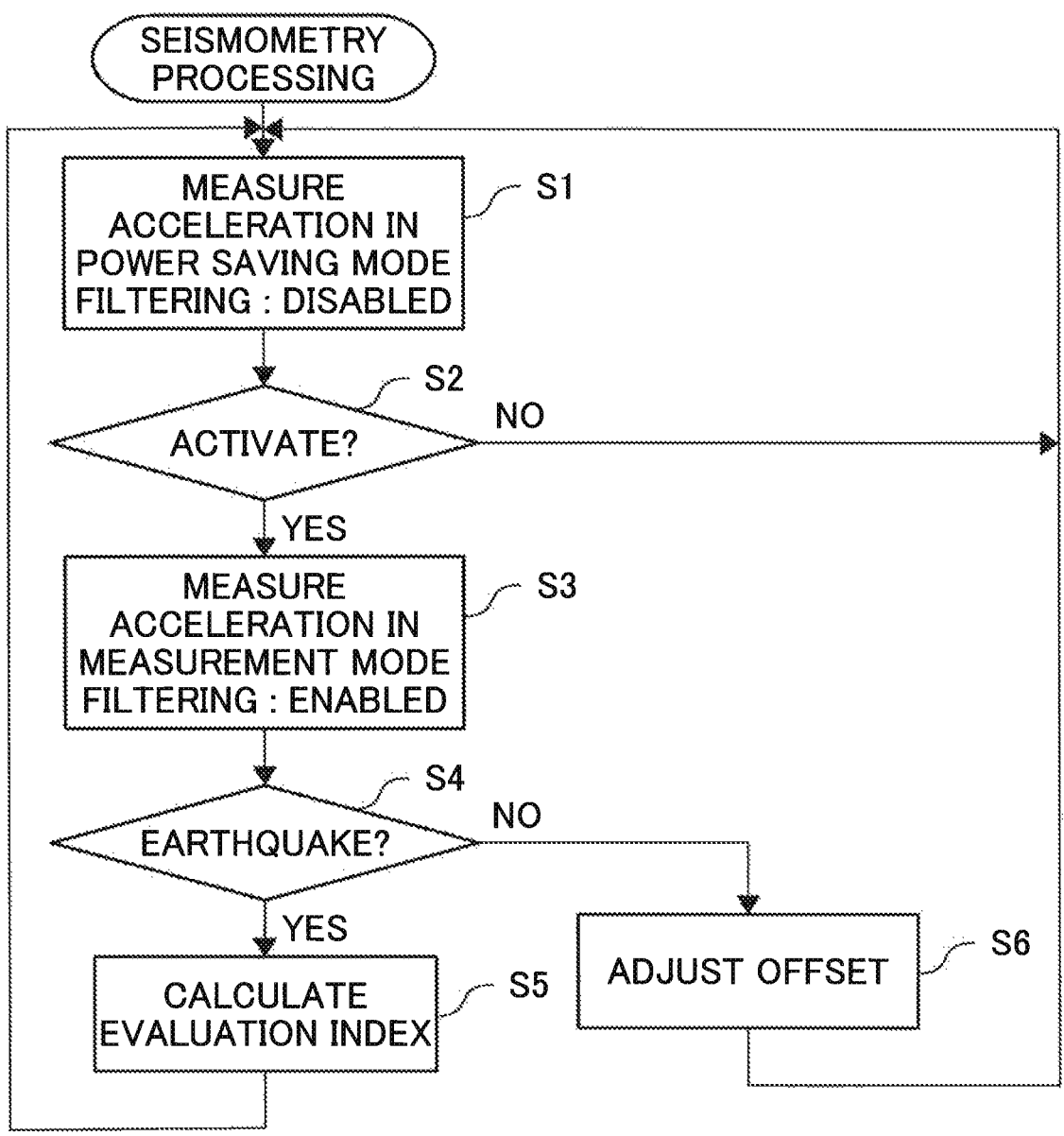
FIG. 4 is a process flow diagram showing an example of seismic processing.

FIG. 4 is a process flow diagram showing an example of seismometry processing. First, the acceleration measurement unit 101 of the seismic sensor 1 measures the acceleration in the power-saving mode (FIG. 4: S1). In the power-saving mode, the acceleration measurement unit 101 performs low-speed sampling. In addition, the activation determination unit 103 of the seismic sensor 1 determines whether or not activation (that is, shifting to the measurement mode) is to be performed (S2). In this step, in the case Where the acceleration measured in S1 is less than or equal to the threshold shown in FIG. 3 (the activation threshold, e.g. 50 gal) (S2:NO), the processing shifts to S1, and the power-saving mode (low-speed sampling) is continued. On the other hand, in the case where the acceleration measured in S1 is greater than the threshold shown in FIG. 3 (S2: YES), the acceleration measurement unit 101 shifts to the measurement mode. Note that, as shown in FIG. 3(2), the activation threshold is a relative value based on the offset. In the measurement mode, the acceleration measurement unit 101 performs high-speed sampling.

Thereafter, the acceleration measurement unit 101 measures the acceleration with high-speed sampling in the measurement mode, and the filtering unit 110 performs filtering processing on the measured acceleration, and causes the acceleration storage unit 102 store the result values (S3). In addition, the earthquake determination unit 105 of the seismic sensor 1 performs an earthquake determination (in other words, noise determination) (S4). Note that, the filtering may be performed after the microcontroller 12 shifts to the active mode, or may be performed by the acceleration sensor 11 with the microcontroller 12 still in the sleep mode. In this step, it is determined whether the detected vibration is due to an earthquake or noise. For example, if the vibration does not continue for a predetermined time or more, it is determined that the vibration measured in S1 was not an earthquake, but rather was noise. Specifically, the moving average (which is also referred to as a "filter value") of the absolute value of the acceleration sampled multiple times at a high speed is obtained, and, for example, the difference between the maximum and the minimum value of the filter value in a predetermined time (e.g. one second) is calculated, the average value of the filter value is calculated, or the sum of the average value and a variance value (or the standard deviation) of the filter value is calculated. Then, in the case where the calculated value is larger than a predetermined threshold (an earthquake determination threshold, e.g. 100 gal), it is determined that an earthquake has occurred. Note that, the earthquake determination threshold used in this step is preferably a value different from the activation threshold, but may also be the same value as the activation threshold. In addition, in the case where the sum of the average value and the variance value (or the standard deviation) is adopted, for example, letting the standard deviation be σ, the value obtained by multiplying σ by a predetermined coefficient may also be handled as the variance value. Thus, in the case where a noise component following a normal distribution is detected, activation caused by a noise is suppressed. Note that the value used in earthquake or noise determination is not limited to the abovementioned examples. For example, it is possible to use the maximum value of the filter value, the minimum value of the filter value, the average of the filter value, the variance value (standard deviation) of the filter value, or a value obtained by combining two or more of such values by addition, subtraction, multiplication or division. In S4, when this value and the earthquake determination threshold are in a predetermined magnitude relation, it is determined that an earthquake has occurred.

In the case where it is determined in S4 that an earthquake has occurred (S4: YES), the evaluation index calculation unit 106 of the seismic sensor 1 calculates an evaluation index indicating the scale of the earthquake (S5). Note that the microcontroller 12 operates in the active mode when performing the calculation of the evaluation index. In this step, for example, an SI value is calculated. The SI value is an example of an earthquake evaluation index, which is acknowledged to relate to the extent of damage to buildings. Note that it is assumed that the output unit 107 of the seismic sensor 1 outputs the calculated evaluation index to another device. Specifically, the SI value can be calculated by using the following Formula 1.

$$SI = \frac{1}{2.4} \int_{0.1}^{2.5} Sv(T, h) dT \qquad \text{[Formula 1]}$$

The above SI value is an index for indicating the destructive power of earthquake motion by the average of velocity response spectrum integral values in the period of 0.1 to 2.5 seconds which is natural period of a rigid structure. Note that Sv denotes the velocity response spectrum, T denotes the period, and h denotes the damping constant.

On the other hand, in the case where it is determined in S4 that no earthquake has occurred (S4:NO), the offset adjustment unit 108 of the seismic sensor 1 adjusts the offset (S6). In this step, for example, the average value of the acceleration shown by the dashed-dotted line in FIG. 3(1) is calculated as the offset. In this way, the threshold reference is adjusted.

Effects

According to the abovementioned embodiment, due to the filtering unit 110 filtering the acceleration, noise with an extreme magnitude is eliminated. The accuracy of the earthquake determination is thus enhanced, and in the case where no earthquake has occurred, returning to the power-saving mode can be done promptly. Accordingly, it is possible to suppress wasteful power consumption due to unnecessarily determining that an earthquake has occurred and calculating the evaluation index. That is, the power consumption of the seismic sensor can be suppressed.

Variations

A configuration is possible in which dynamic adjustment of the offset (e.g. S6) is not performed in the process flow diagram shown in FIG. 4. Even in the case of this mode, the enhancement in the accuracy of the earthquake determination by the filtering can reduce the power consumption of the seismic sensor.

In addition, a configuration is possible in which, in the abovementioned S5, the output unit 107 not only outputs the evaluation index directly, but also, in the case where the evaluation index exceeds a predetermined threshold, generates a predetermined pulse pattern or outputs a binary signal such as On/Off and High/Low to notify the occurrence of an earthquake with a predetermined magnitude or higher to an external device. If a setting is used to switch whether the seismic sensor 1 outputs the evaluation index or a pulse pattern or the like, it is possible to provide a seismic sensor that is compatible with an existing device.

INDEX TO THE REFERENCE NUMERALS

1 . . . seismic sensor, 11 . . . acceleration sensor, 12 . . . microcontroller, 13 . . . storage unit, 14 . . . output unit, 15 . . . input unit, 101 . . . acceleration measurement unit, 102 . . . acceleration storage unit, 103 . . . activation determination unit, 104 . . . reference value storage unit, 105 . . . earthquake determination unit, 106 . . . evaluation index calculation unit, 107 . . . output unit, 108 . . . offset adjustment unit, 109 . . . determination storage unit, 110 . . . filtering unit

The invention claimed is:

1. A seismic sensor that operates in a power-saving mode and a measurement mode in which power consumption is larger than that in the power-saving mode, the seismic sensor comprising:
an accelerometer that measures an acceleration;
an activation determination unit causes a shift from the power-saving mode to the measurement mode to be performed, in a case where the acceleration measured by the measurement unit exceeds a predetermined threshold;
a filtering unit that performs filtering on the measured acceleration;
an earthquake determination unit that determines whether or not an earthquake has occurred based on the filtered acceleration; and
an index calculator that, in a case where the earthquake determination unit determined that an earthquake has occurred, calculates an index value indicating a scale of the earthquake,
wherein a shift from the measurement mode to the power-saving mode is performed in a case where the earthquake determination unit determined that no earthquake has occurred, and
the earthquake determination unit is configured to determine that an earthquake has occurred in a case where a difference between a maximum value and a minimum value of, or a sum of an average and a variance value of acceleration that was measured in a predetermined time and filtered is larger than a predetermined threshold.

2. The seismic sensor according to claim 1, wherein the filtering unit calculates a moving average of the measured acceleration.

3. An earthquake determination method executed by a seismic sensor that operates in a power-saving mode and in a measurement mode in which power consumption is larger than that in the power-saving mode, the earthquake determination method comprising:
a measurement step of measuring an acceleration;
an activation determination step causing a shift from the power-saving mode to the measurement mode to be performed, in a case where the acceleration measured by the measurement unit exceeds a predetermined threshold;
a filtering step of performing filtering on the measured acceleration;

an earthquake determination step of determining whether or not an earthquake has occurred based on the filtered acceleration; and an index calculation step of, in a case where it was determined that an earthquake has occurred, calculating an index value indicating a scale of the earthquake, wherein in a case where it was determined that no earthquake has occurred in the earthquake determination step, a shift from the measurement mode to the power-saving mode is performed, and in the index calculation step, determining that an earthquake has occurred in a case where a difference between a maximum value and a minimum value of, or a sum of an average and a variance value of acceleration that was measured in a predetermined time and filtered is larger than a predetermined threshold.

* * * * *